United States Patent
Bureau et al.

(10) Patent No.: US 9,056,609 B2
(45) Date of Patent: Jun. 16, 2015

(54) POWERTRAIN CONTROL SYSTEM

(75) Inventors: Baptiste Bureau, Coventry (GB); Scott Balder, Coventry (GB); Adam Leatherland, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 0 days.

(21) Appl. No.: 14/344,424

(22) PCT Filed: Sep. 11, 2012

(86) PCT No.: PCT/EP2012/067742
§ 371 (c)(1),
(2), (4) Date: Jun. 10, 2014

(87) PCT Pub. No.: WO2013/037777
PCT Pub. Date: Mar. 21, 2013

(65) Prior Publication Data
US 2014/0315684 A1 Oct. 23, 2014

(30) Foreign Application Priority Data
Sep. 13, 2011 (GB) .................................. 1115822.7

(51) Int. Cl.
*B60W 10/06* (2006.01)
*B60W 10/10* (2012.01)
*F02N 11/08* (2006.01)

(52) U.S. Cl.
CPC ............. *B60W 10/10* (2013.01); *Y10T 477/675* (2015.01); *F02N 11/0833* (2013.01); *F02N 11/0837* (2013.01); *F02N 2200/0802* (2013.01); *F02N 2200/124* (2013.01); *Y02T 10/48* (2013.01); *B60W 10/06* (2013.01)

(58) Field of Classification Search
USPC ......... 477/107, 110, 111, 901; 701/51, 54, 61
See application file for complete search history.

(56) References Cited

U.S. PATENT DOCUMENTS

| | | | | |
|---|---|---|---|---|
| 3,808,810 A * | 5/1974 | Schott et al. | .................... | 60/416 |
| 4,362,133 A * | 12/1982 | Malik | ............... | 477/99 |
| 4,421,082 A * | 12/1983 | Katayose et al. | ............. | 123/333 |
| 5,522,777 A * | 6/1996 | Baxter et al. | .................... | 477/36 |
| 6,213,242 B1 * | 4/2001 | Rodrigues et al. | ............ | 180/249 |
| 8,485,941 B2 * | 7/2013 | Beechie et al. | ............... | 477/110 |
| 2009/0298644 A1* | 12/2009 | Nihei et al. | ................... | 477/107 |
| 2011/0196584 A1* | 8/2011 | Fox et al. | ........................ | 701/51 |

FOREIGN PATENT DOCUMENTS

| | | |
|---|---|---|
| EP | 1355209 A1 | 10/2003 |
| GB | 2486453 A | 6/2012 |
| WO | 9727388 | 7/1997 |

OTHER PUBLICATIONS

"Stop/Start" In "Freelander 2—Owner's Handbook," 2009, Land Rover Technical Communications, XP002686551, pp. 100-101.
International Search Report for International application No. PCT/EP2012/067742 mailed Nov. 19, 2012.

* cited by examiner

*Primary Examiner* — Justin Holmes
(74) *Attorney, Agent, or Firm* — Carlson, Gaskey & Olds

(57) ABSTRACT

The present application relates to a powertrain control system (1) for a motor vehicle. The vehicle has an internal combustion engine (5) coupled to a transmission (9). The transmission (9) is operable in a high range and a low range. The powertrain control system (1) has a stop/start controller (11) for issuing an engine stop request signal when one or more conditions have been met. An inhibitor (15) is also provided for inhibiting operation of the stop/start controller (11) when the low range is selected. The application also relates to a method of operating a motor vehicle power-train.

20 Claims, 2 Drawing Sheets

Stop/Start Transmission Interface

POWERTRAIN CONTROL SYSTEM

TECHNICAL FIELD

The present invention relates to a powertrain control system for a motor vehicle, to a method of operating a motor vehicle powertrain and to a vehicle comprising a powertrain control system.

BACKGROUND

It is known to provide motor vehicles with an engine stop/start system with a view to improving fuel economy. The stop/start system is designed to turn the engine off automatically when pre-defined engine-stop conditions are met, e.g. that the vehicle is being held stationary with a driver-operated brake pedal depressed. The condition in which the vehicle is held stationary with the engine automatically switched off during a drive cycle is known as an 'eco-stop' condition.

When the driver releases the brake pedal the engine may be restarted and a transmission of the vehicle may be re-engaged. That is, under 'no fault' normal operating conditions, release of the brake pedal by the driver triggers the engine to be restarted, the driveline to be closed and torque to be transmitted to the drive wheels. The condition of restarting the engine during a drive cycle is known as an 'eco-start' condition.

Whilst it is acceptable to stop and start the engine in this manner during normal operation of a vehicle, the inventors have recognised that it can prove unsettling for the driver in certain circumstances, for example when driving an off-road vehicle over steep and/or undulating terrain.

The present invention sets out to address the afore-mentioned shortcoming.

SUMMARY OF THE INVENTION

An illustrative example embodiment of a powertrain control system for a motor vehicle comprises an internal combustion engine and a transmission operable in a high range and a low range; the powertrain control system comprising a stop/start controller for issuing an engine stop request signal; and an inhibitor for inhibiting operation of the stop/start controller when the low range is selected in the transmission.

When the high range is selected in the transmission, the stop/start controller can operate to improve fuel economy by stopping the engine when certain pre-defined criteria have been satisfied, for example the vehicle is stationary and the driver is in the vehicle. However, when the low range is selected in the transmission, the inhibitor can prevent or restrict operation of the stop/start controller. Accordingly, the stop/start controller cannot stop the engine when the low range is selected. It will be appreciated that the user is free to stop the engine manually irrespective of which drive range is selected in the transmission.

The transmission is typically a transfer case operable in said high and low ranges. The transfer case can be coupled to the output of the vehicle's main transmission. For example, the high range can provide a 1:1 drive ratio; and the low range can provide a 3:1 drive ratio. The transfer case may be operable only in said high range and said low range.

The powertrain control system can comprise a range detector for determining when the low range has been selected. The range detector can, for example, be provided in a transmission control module. The range detector can receive a high range signal and/or a low range signal from a sensor to indicate the selected drive range of the transmission. Alternatively, the range detector can receive a request signal from a range selector to initiate a change from the high range to the low range. The high range signal, low range signal and/or the request signal could be received from a CAN bus for receiving data relating to the operational state of the vehicle.

The range detector can be configured to issue a control signal when it determines that the low range has been selected. The inhibitor can be configured to inhibit operation of the stop/start controller upon receipt of said control signal from the range detector. The control signal can be transmitted to the CAN bus and/or to the inhibitor.

If the engine has been stopped by the stop/start controller and the low range is selected (while the engine is stopped in said eco-stop mode), an engine running signal can be sent to re-start, or permit manual re-start of the engine. A check is typically performed to ensure that any stop/start system conditions for starting the engine are satisfied before sending the engine running signal. The inhibitor can subsequently inhibit operation of the stop/start controller while the low range is selected.

The powertrain control system can further comprise a terrain optimisation selector for activating one of a plurality of pre-configured powertrain operating modes configured for particular terrain types. The operating modes can, for example, be configured for one or more of the following types of terrain: Normal; Grass, Gravel & Snow; Sand, Mud & Ruts; Snow; and Rock Crawl. The operating modes may, for example, provide different throttle responses and/or include selecting a low range in the transmission. When an operating mode is activated which requires that the low range is selected, the inhibitor can be activated to inhibit operation of the stop/start controller. The terrain optimisation selector can output a control signal to the inhibitor and/or the CAN bus.

The inhibitor can be separate from the stop/start controller and can operate to disable the stop/start controller. Alternatively, the inhibitor can form part of the stop/start controller. Accordingly, the stop/start controller (via the inhibitor) can be instructed to inhibit engine stops until the high range is selected.

A processor can be provided for monitoring one or more operational states of the vehicle. The processor can, for example, be connected to the CAN bus to obtain information, such as one or more of the following: vehicle speed; engine speed; throttle position; road roughness; selected ride height mode and transmission/drive state. Utilising this data, the processor can determine when it would be appropriate to select the low range in the transmission. For example, the processor may compare the measured operational states with stored threshold data, for example stored in a look-up table. If the processor determines that the low range should be selected, the inhibitor may be engaged to inhibit operation of the stop/start controller. A notification may be provided to alert the driver that the low range should be selected and/or that start/stop operation will be inhibited as a result of selecting low range.

An illustrative example embodiment of a method of operating a motor vehicle powertrain having an internal combustion engine and a transmission comprises: operating the engine in a stop/start mode when a high range is selected in the transmission; and inhibiting the stop/start mode when a low range is selected in the transmission. When the engine is operating in said stop/start mode, the engine will automatically be stopped and started when one or more pre-defined conditions are satisfied.

The method can include the step of re-starting the engine if the low range is selected while the engine has been stopped by the stop/start mode. The method can also include checking to ensure that any stop/start conditions for starting the engine are satisfied before re-starting the engine. The operation of the stop/start mode can subsequently be inhibited while the low range is selected.

The transmission can consist of said high range and said low range. The transmission can be a transfer case. The transfer case can be coupled to a primary transmission of the vehicle. The vehicle can be a 4×4 vehicle suitable for use off-road.

The method can comprise activating one of a plurality of pre-configured powertrain operating modes. The powertrain operating modes can comprise selecting a low range in the transmission, for example to suit driving on a particular terrain type. When a powertrain operating mode is activated which selects the low range, the stop/start mode can be inhibited.

The method can include monitoring one or more driving characteristics of the vehicle and inhibiting the stop/start mode when it is determined that the low range in the transmission should be selected.

In a further aspect, the present invention relates to a powertrain control system for a motor vehicle comprising an internal combustion engine and a transmission operable in a high range and a low range; the powertrain control system comprising: a stop/start controller for issuing an engine shut down and engine start request; a processor for monitoring one or more driving characteristics of the vehicle to determine when the low range in the transmission should be engaged; and an inhibitor for inhibiting operation of the stop/start controller when the processor determines that the low range should be engaged.

The processor can, for example, be connected to the CAN bus to obtain information, such as one or more of the following: vehicle speed; engine speed; throttle position; road roughness; and transmission/drive state. Utilising this data, the processor can determine when it would be appropriate to select the low range in the transmission. For example, the processor may compare the measured operational states with stored threshold data, for example stored in a look-up table.

By way of example, an eco-stop can be initiated when the vehicle is brought to a stop (starting from a speed greater than four (4) kph); and/or sufficient brake pressure is applied to ensure the vehicle is stationary. Alternatively, the eco-stop can be initiated when the vehicle is stationary and either the Neutral or Park drive mode is selected.

Furthermore, the engine eco-start can be initiated when one or more of the following conditions have been met: (a) the brake pedal is released (typically in drive or sport modes); (b) reverse is selected; (c) the accelerator is pressed; or (d) an automatic restart occurs. The engine can complete an automatic restart for one or more of the following reasons: interior cabin temperature requires climate control (for example due to a significant increase or decrease in the interior temperature); the windscreen begins to mist; the battery state of charge is low; the brake vacuum has been reduced (for example due to repeated presses of the brake pedal with the engine off); the vehicle speed increases over one (1) kph; or the stop/start system is deactivated.

The powertrain control system can be implemented in hardware, software or a combination of hardware and software. The powertrain control system can comprise one or more computational processors configured to perform the referenced functions. The processor(s) can be connected to one or more data storage devices, such as read only memory (ROM), storing computational instructions. Equally, the method(s) described herein can be performed by one or more computational processors.

In a further aspect, the present invention relates to a motor vehicle comprising a powertrain control system of the kind described above and to a motor vehicle comprising a powertrain which is operable in accordance with the above-described method.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying drawings, in which.

DETAILED DESCRIPTION OF THE INVENTION

Figure 1:
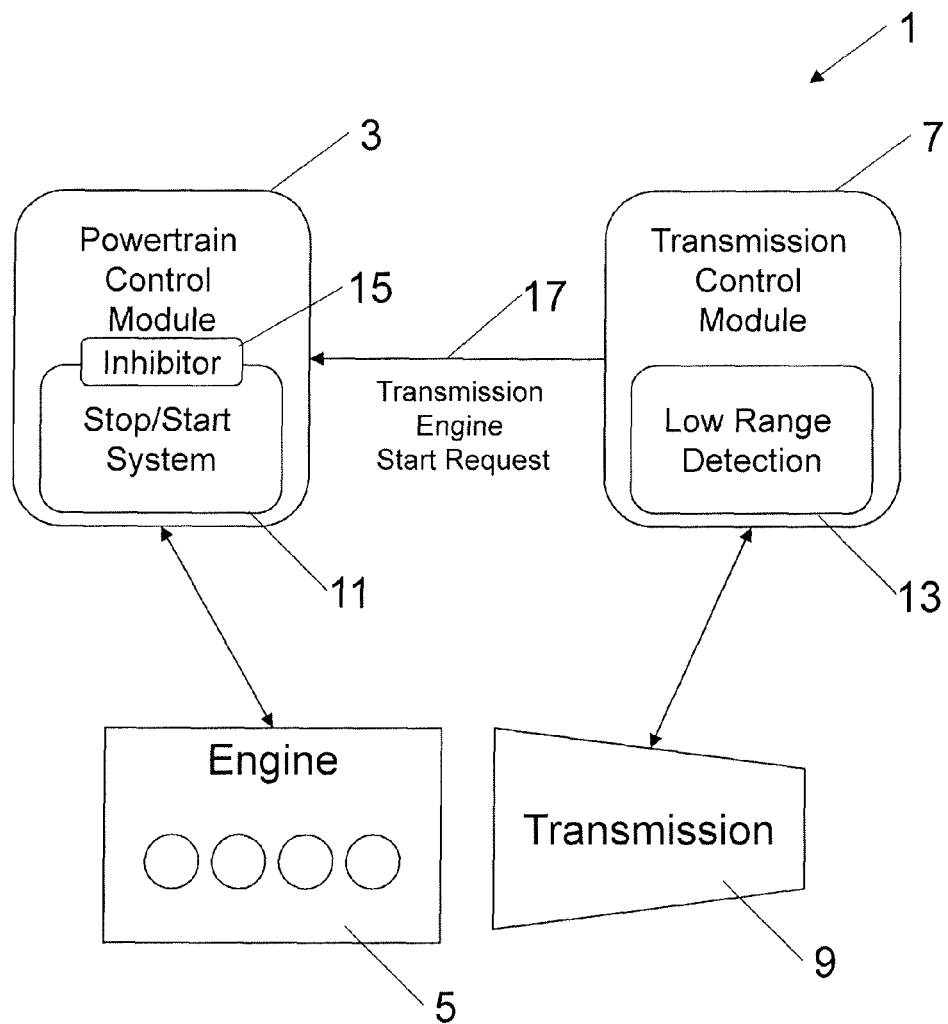
FIG. 1 shows a schematic overview of a powertrain control system according to the present invention.

A powertrain control system 1 for a motor vehicle (not shown) in accordance with the present invention is illustrated in FIG. 1. The powertrain control system 1 comprises a powertrain control module (PCM) 3 for controlling an internal combustion engine 5; and a transmission control module (TCM) 7 for controlling a transmission 9.

The motor vehicle is a 4×4 vehicle capable of operating off-road. In the present embodiment, the transmission 9 is a transfer case capable of operating in either a high range or a low range. The high range is used for normal road driving and also for off-road driving across substantially level terrain. The low range may be engaged for low speed manoeuvring, such as negotiating steep surfaces or boulder strewn terrain. The low range can also be used for extreme off-road conditions where progress in high range cannot be maintained.

The transfer case is connected to an output shaft of the vehicle's main transmission (not shown). The high range in the transfer case provides a drive ratio of 1:1; and the low range provides a drive ratio of 3:1. A range selector, such as a lever or button, is provided to allow a user to select the high range and the low range. The range selector can manually select the drive range; or can initiate an automatic or semi-automatic selection of the drive range.

The powertrain control module 3 has a stop/start system 11 configured to turn the engine 5 off (a so-called eco-stop) when predefined engine-stop conditions are satisfied, for example the vehicle is being held stationary and the driver is in the car. The stop/start system 11 requests the engine 5 to start for continued operation when predefined engine-start conditions are satisfied subsequently, for example release of the brake pedal.

The transmission control module 7 has a range detector 13 for detecting the operating range of the transmission 9. A sensor is provided for sensing whether the high range or the low range is currently selected in the transmission 9. The range detector 13 outputs a range signal (either a high range signal or a low range signal) to indicate the operating range of the transmission 9 which is currently selected. The range signal can be supplied to a CAN bus (not shown) for access by the other vehicle systems.

The powertrain control system 1 further comprises an inhibitor 15 configured to inhibit operation of the stop/start system 11 when the transmission 9 is operating in a low range. The range signal output from the range detector 13 enables the powertrain control module 3 to determine the operating range of the transmission 9. When the range detector 13 outputs a low range signal, the stop/start system 11 is inhibited by the inhibitor 15 to prevent engine stop request signals being transmitted. The stop/start system 11 can, for example, be disabled by the inhibitor 15. Only when the powertrain control module 3 determines that the high range has been selected (as indicated by a high range signal being output by the range detector 13) is the stop/start system 11 activated.

The transmission control module 7 can also communicate with the powertrain control module 3, for example via the CAN bus. The transmission control module 7 can generate an engine running request signal 17 which is transmitted to the powertrain control module 3 to start the engine 5. The engine running request signal 17 is generated when the engine has been stopped by the stop/start system 11 and, whilst the engine 5 remains stopped in the eco-stop, the range detector 13 determines that the low range has been selected. Provided the predefined start-up conditions are satisfied, the stop/start system 11 will request to restart the engine 5 in response to the engine running request signal 17 from the transmission control module 7. Alternatively, in dependence on user-preferences, the system may permit manual re-starting of the engine. The inhibitor 15 subsequently inhibits operation of the stop/start system 11 while the low range is selected.

The powertrain control system 1 may optionally comprise a terrain optimisation selector (not shown) for activating one of a plurality of powertrain operating modes. The powertrain operating modes are pre-configured to match the operating characteristics of the powertrain to a particular terrain type, such as: Normal; Grass, Gravel & Snow; Sand, Mud & Ruts; Snow and Rock Crawl. The operating modes may, for example, specify different throttle response settings. Moreover, the powertrain operating modes can provide the transmission control module 7 with instructions to select either the high range or the low range in the transmission 9. By way of example, a powertrain operating mode configured for traversing rocks (so-called "rock crawling") might require that the low range is selected, combined with a rapid throttle response to provide rapid acceleration/deceleration albeit at low speeds.

When a powertrain operating mode is activated which requires that the low range is selected, the inhibitor 15 is activated to inhibit operation of the stop/start system 11. For example, selecting a powertrain operating mode which selects a low range may cause a control signal to be sent automatically to the inhibitor 15 to inhibit operation of the stop/start system 11.

Figure 2:
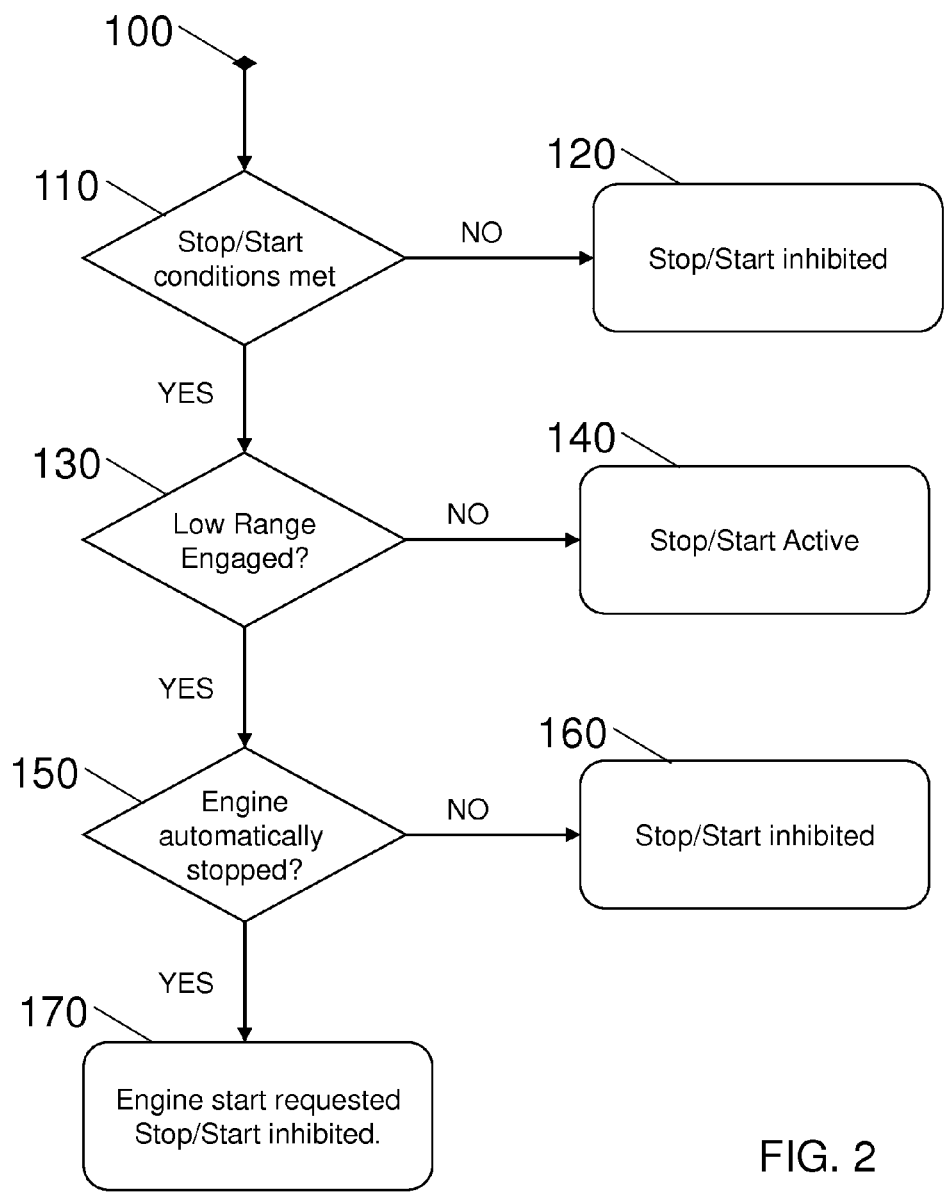
FIG. 2 shows a flow diagram for operation of the powertrain control system in accordance with the present invention.

The operation of the powertrain control system 1 will now be described with reference to the flow chart shown in FIG. 2.

The engine 5 is initially operating in conventional manner (STEP 100). A first check (STEP 110) is performed to determine if the engine stop conditions and/or the engine start conditions have been satisfied. The stop conditions in the present embodiment consist of checking that the vehicle is being held stationary and that the driver is in the vehicle. If the stop conditions are not satisfied, for example because the vehicle is moving, operation of the stop/start system 11 is inhibited (STEP 120) and the engine continues to operate.

If the stop/start conditions have been satisfied, for example the vehicle comes to a halt and is held stationary, a second check (STEP 130) is initiated to determine if the low range in the transmission 9 is engaged. Specifically, the CAN bus is interrogated to determine if the range detector 13 has output a low range signal. If the low range signal is not detected, the stop/start system 11 is activated (STEP 140) and an engine stop request signal generated to stop the engine 5.

If a low range signal is detected (indicating that the low range is engaged), a third check (STEP 150) is performed to determine if the engine 5 has been stopped by the stop/start system 11 in an eco-stop. If the engine 5 has not been stopped by the stop/start system 11, the operation of the stop/start system 11 is inhibited (STEP 160).

If the stop/start system 11 has stopped the engine 5 and the engine remains stopped when the low range is selected, the engine start request signal 17 is generated to start the engine (STEP 170). The operation of the stop/start system 11 is again inhibited whilst the low range is selected.

Once the high range is selected, provided the other criteria are satisfied, the stop/start system 11 is activated for use in conventional manner.

In the light of the foregoing, it will be appreciated that the present invention can inhibit operation of the stop/start system 11 when the low range is selected for the transmission 9. By inhibiting the operation of the stop/start system 11 when the low range is selected, the engine will be prevented from undergoing an eco-stop when the vehicle may be traversing difficult terrain. Moreover, if the engine has already been stopped by the stop/start system 11 and the low range is selected, the engine will be restarted and operation of the stop/start system 11 inhibited.

The powertrain control module 3 and the transmission control module 7 are implemented on one or more electronic microprocessors. Likewise, the stop/start system 11, the low range detector 13 and the inhibitor 15 can be implemented on one or more electronic microprocessors.

It will be appreciated that the system may be provided with means for manually overriding intervention of stop-start whilst operating the vehicle in low-range. Such means may be provided by a manual control such as a switch or lever, or may be provided by means of a touch screen and a graphical user interface displayed thereon and operable by the user operating the vehicle. The provision of means for manually overriding the system of the present invention may prove useful in certain types of vehicle operation, or to temporarily overcome a vehicle response to a component malfunction. In particular, the means for manually overriding the system of the present invention may advantageously be used as a service or fault diagnosis mode to test sub-system function during routine maintenance. It will be appreciated that various changes and modifications can be made to the arrangement described herein within departing from the scope of the present invention.

The invention claimed is:

1. A powertrain control system for a motor vehicle comprising an internal combustion engine and a transmission operable in a high range and a low range; the powertrain control system comprising:
    a stop/start controller for issuing an engine stop request signal; and
    an inhibitor for inhibiting operation of the stop/start controller when the low range is selected.

2. A powertrain control system as claimed in claim 1, wherein the stop/start controller is configured to issue an engine running signal if the low range is selected when the engine has been stopped by the stop/start controller.

3. A powertrain control system as claimed in claim 1, comprising a range detector for determining when the low range has been selected.

4. A powertrain control system as claimed in claim 3, wherein the range detector is configured to issue a control signal when it determines that the low range has been selected.

5. A powertrain control system as claimed in claim 4, wherein the inhibitor is configured to inhibit operation of the stop/start controller upon receipt of said control signal from the range detector.

6. A powertrain control system as claimed in claim 1, comprising a terrain optimisation selector for activating one of a plurality of pre-configured powertrain operating modes.

7. A powertrain control system as claimed in claim 6, wherein at least one of said pre-configured powertrain operating modes includes selecting the low range in the transmission.

8. A powertrain control system as claimed in claim 7, wherein the inhibitor is configured to inhibit operation of the stop/start controller when the terrain optimisation selector activates said at least one pre-configured powertrain operating mode which includes selecting the low range.

9. A powertrain control system as claimed in claim 1, wherein the inhibitor is provided in said stop/start controller; or the inhibitor is separate from the stop/start controller.

10. A powertrain control system as claimed in claim 1, comprising a processor for monitoring one or more driving characteristics of the vehicle to determine when the low range in the transmission should be selected.

11. A powertrain control system as claimed in claim 10, wherein the inhibitor is configured to inhibit operation of the stop/start controller when the processor determines that the low range should be selected.

12. A powertrain control system as claimed in claim 1, wherein
the transmission comprises a transfer case that is operable in the high range or the low range.

13. A powertrain control system as claimed in claim 1, wherein
the high range comprises a gear ratio that is not included in the low range; and
the low range comprises another, different gear ratio that is not included in the high range.

14. A method of operating a motor vehicle powertrain, the powertrain comprising an internal combustion engine and a transmission, wherein the method comprises:
operating the engine in a stop/start mode when a high range is selected in the transmission; and
inhibiting the stop/start mode when a low range is selected in the transmission.

15. A method as claimed in claim 14, wherein the engine is re-started if the low range is selected while the engine has been stopped by the stop/start mode.

16. A method as claimed in claim 14, wherein pre-configured powertrain operating modes are user selectable; the stop/start mode being inhibited when a pre-configured operating mode is activated which is configured to select the low range in the transmission.

17. A method as claimed in claim 14, comprising monitoring one or more driving characteristics of the vehicle and inhibiting the stop/start mode when it is determined that the low range in the transmission should be selected.

18. A method as claimed in claim 14, wherein
the transmission comprises a transfer case that is operable in the high range or the low range.

19. A method as claimed in claim 14, wherein
the high range comprises a gear ratio that is not included in the low range; and
the low range comprises another, different gear ratio that is not included in the high range.

20. A motor vehicle comprising:
an internal combustion engine;
a transmission operable in a high range and a low range; and
a powertrain control system including
a stop/start controller for issuing an engine stop request signal; and
an inhibitor for inhibiting operation of the stop/start controller when the low range is selected.

* * * * *